United States Patent
Huang

(10) Patent No.: US 9,230,316 B2
(45) Date of Patent: Jan. 5, 2016

(54) DEFECT INSPECTION DEVICE FOR DISPLAY PANEL AND METHOD FOR THE SAME

(71) Applicant: Haibo Huang, Shenzhen (CN)

(72) Inventor: Haibo Huang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 52 days.

(21) Appl. No.: 14/239,126

(22) PCT Filed: Jan. 9, 2014

(86) PCT No.: PCT/CN2014/070386
§ 371 (c)(1),
(2) Date: Feb. 14, 2014

(87) PCT Pub. No.: WO2015/100777
PCT Pub. Date: Jul. 9, 2015

(65) Prior Publication Data
US 2015/0187064 A1    Jul. 2, 2015

(30) Foreign Application Priority Data

Dec. 31, 2013   (CN) .......................... 2013 1 0752733

(51) Int. Cl.
*G06K 9/00* (2006.01)
*G06K 9/48* (2006.01)
*G09G 5/10* (2006.01)
*G06T 7/00* (2006.01)

(52) U.S. Cl.
CPC ............. *G06T 7/0004* (2013.01); *G06T 7/0085* (2013.01); *G06T 2207/30121* (2013.01)

(58) Field of Classification Search
CPC ............... G06T 7/0004; G06T 7/001; G06T 2207/30148; G06T 2207/30164; G06T 7/0006; G06T 7/0085; G06T 2207/30121
USPC ......... 382/141, 100, 145, 149, 147, 144, 173, 382/162, 163, 168, 170, 181, 190, 195, 382/199; 345/204, 690, 55, 30, 84, 87, 214, 345/530, 418, 441; 349/56, 84, 104, 106, 349/139, 143, 146; 250/306, 307; 348/46; 356/237.1, 237.6, 630
See application file for complete search history.

(56) References Cited

U.S. PATENT DOCUMENTS

| | | | | |
|---|---|---|---|---|
| 6,075,880 | A  * | 6/2000 | Kollhof et al. | 382/141 |
| 7,791,572 | B2 * | 9/2010 | Hwang | 345/87 |
| 7,889,188 | B2 * | 2/2011 | Hwang | 345/204 |
| 7,889,358 | B2 * | 2/2011 | Itoh | 356/630 |
| 8,797,388 | B2 * | 8/2014 | Masumura et al. | 348/46 |
| 2008/0023893 | A1 * | 1/2008 | Hamaya et al. | 266/271 |
| 2008/0111805 | A1 * | 5/2008 | Chang | 345/208 |

* cited by examiner

*Primary Examiner* — Sheela C Chawan
(74) *Attorney, Agent, or Firm* — Andrew C. Cheng

(57) ABSTRACT

The present invention provides a defect inspection method and device for a display panel. The defect inspection method comprises: A) obtaining an edge image of the display panel and obtaining a grayscale value of each pixel of the edge image; B) selecting a specific area in the edge image and obtaining a grayscale value of each pixel in the specific area; C) obtaining an average grayscale value of all pixels in the specific area; D) executing binarization for the grayscale value of each pixel in the specific area to obtain some boundary lines based on the average grayscale value, wherein the grayscale values of pixels on the boundary lines are different from grayscale values of the other pixels which are not on the boundary lines; E) filtering horizontal and vertical lines of the boundary lines to obtain some remaining boundary lines; and F) fitting a defect specification line for the remaining boundary lines, wherein, if widths of the remaining boundary lines are not smaller than a width of the defect specification line, confirming that the remaining boundary lines are defect lines.

16 Claims, 2 Drawing Sheets

DEFECT INSPECTION DEVICE FOR DISPLAY PANEL AND METHOD FOR THE SAME

BACKGROUND OF THE INVENTION

1. Field of the Invention

The present invention relates to the technical field of defect inspection for a display panel; and more particularly to a defect inspection device for a display panel and a method for the same.

2. Description of Related Art

With the rapid development of technology in the display field, the display panel with high-quality image (e.g., LCD panel) has become increasingly popular. However, according to conventional manufacturing techniques of display panel, to completely avoid display defects is very difficult and impractical. Therefore, in the manufacturing process of the display panel, executing a step of display defect inspection for a display panel is necessary.

The prior art, it generally utilize the light source to illuminate the display panel, and obtain a corresponding greyscale image, and then it determines if the display panel exists defect according to if the greyscale image appear the grayscale difference.

However, due to some kinds of defects (e.g., the protrusion or shell cracking at the terminal side of the display panel) that the grayscale difference of the corresponding greyscale image is small when the light source illuminates the display panel so that it is cannot easily be distinguished and easily to be missed. Thereby, it reduces the defect inspection capability of the display panel.

SUMMARY OF THE INVENTION

The main object of the present invention is to provide a defect inspection device for a display panel and method for the same, which can easily distinguish the various defects on the display panel in order to improve the inspection accuracy.

According to one aspect of the present invention, it provides a defect inspection method for a display panel, comprising: A) obtaining an edge image of the display panel and obtaining a grayscale value of each pixel of the edge image; B) selecting a specific area in the edge image and obtaining a grayscale value of each pixel in the specific area; C) averaging the grayscale values of all pixels in the specific area to obtain an average grayscale value of all pixels in the specific area; D) executing binarization for the grayscale value of each pixel in the specific area to obtain some boundary lines based on the average grayscale value, wherein the grayscale values of pixels on the boundary lines are different from grayscale values of the other pixels which are not on the boundary lines; E) filtering horizontal and vertical lines of the boundary lines to obtain some remaining boundary lines; and F) fitting a defect specification line for the remaining boundary lines, wherein, if widths of the remaining boundary lines are not smaller than a width of the defect specification line, confirming that the remaining boundary lines are defect lines.

Wherein, further comprising a step of: G) if the widths of the remaining boundary lines are smaller than the width of the defect specification line, confirming that the remaining boundary lines are not defect lines.

Wherein, in the step D, a specific method to realize "executing binarization for the grayscale value of each pixel in the specific area to obtain some boundary lines based on the average grayscale value" is: comparing the grayscale value of each pixel in the specific area with the average grayscale value; wherein, when a grayscale value of a pixel in the specific area is not smaller than the average grayscale value, the grayscale value of that pixel is set to be "1", and when a grayscale value of a pixel in the specific area is smaller than the average grayscale value, the grayscale value of that pixel is set to be "0".

Wherein, a width of each boundary line is the same as a width of each pixel.

According to one aspect of the present invention, it provides a defect inspection device for a display panel, comprising: an image acquisition unit being configured to obtain an edge image of the display panel and a grayscale value of each pixel in the edge image; a selection unit being configured to select a specific area in the edge image and obtain a grayscale value of each pixel in the specific area; a calculation unit being configured to calculate an average value of the grayscale values of all pixels in the specific area to obtain an average grayscale value of all pixels in the specific area; a binarization unit being configured to execute binarization for the grayscale values of all pixels in the specific area based on the average grayscale value to obtain some boundary lines, wherein, the grayscale values of pixels on the boundary lines are different from grayscale values of the other pixels which are not on the boundary lines; a filter device being configured to filter horizontal and vertical lines of the boundary lines to obtain some remaining boundary lines; a defect determination unit being configured to determine that if widths of the remaining boundary lines are smaller than a width of a defect specification line; and a defect confirmation unit being configured to confirm that the remaining boundary lines are defect lines when the defect determination unit determines that the widths of the remaining boundary lines are not smaller than the width of the defect specification line.

Wherein, when the defect determination unit determines that the widths of the remaining boundary lines are smaller than the width of the defect specification line, the defect confirmation unit confirms that the remaining boundary lines are not defect lines.

Wherein, the binarization unit compares the grayscale value of each pixel in the specific area with the average grayscale value; wherein, when a grayscale value of a pixel in the specific area is not smaller than the average grayscale value, the grayscale value of that pixel is set to be "1", and when a grayscale value of a pixel in the specific area is smaller than the average grayscale value, the grayscale value of that pixel is set to be "0".

Wherein, a width of each boundary line is the same as a width of each pixel.

The defect inspection method and device of the present invention can easily distinguish some defects of the display panel which are difficult to be inspected (e.g., the protrusion or shell cracking at the terminal side of the display panel) to improve the inspection accuracy in order to enhance the defect inspection ability of the display panel.

DETAILED DESCRIPTION OF THE PREFERRED EMBODIMENT

The following content combines with the drawings and the embodiment for describing the present invention in detail. It is obvious that the following embodiments are only some embodiments of the present invention. For the skilled persons of ordinary skill in the art without creative effort, the other embodiments obtained thereby are still covered by the present invention.

Figure 1:
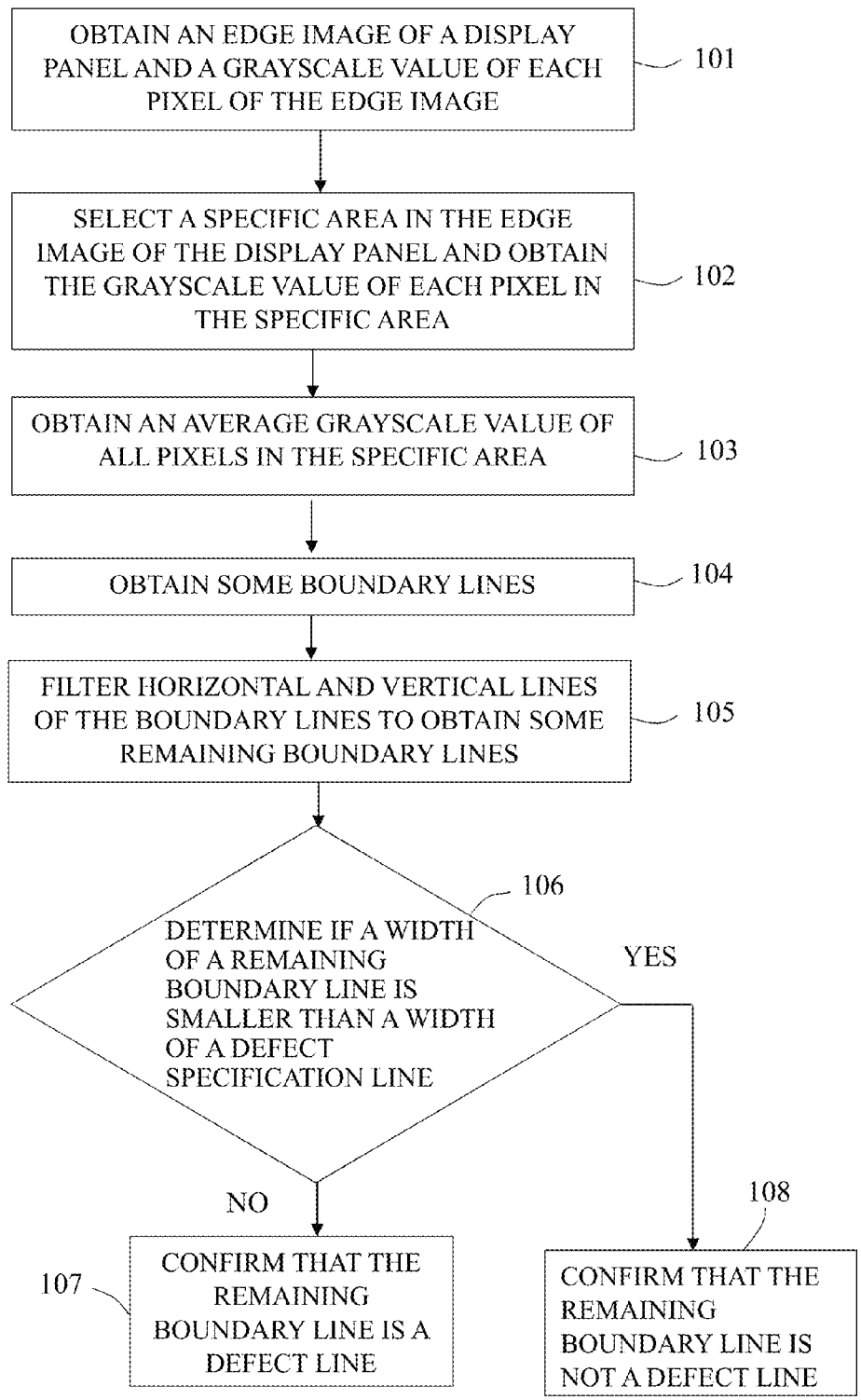
FIG. 1 is a flowchart of defect inspection method for display panel according to an embodiment of the present invention.

FIG. 1 is a flowchart of defect inspection method for display panel according to an embodiment of the present invention.

As shown in FIG. 1, in a step 101, obtaining an edge image of a display panel and obtaining a grayscale value of each pixel of the edge image. For example, utilizing a charge-coupled device (CCD) to scan and capture an image at the edge of the display panel according to the preset parameter to obtain the edge image of the display panel and read the grayscale value of each pixel of the edge image In step 102, selecting a specific area in the edge image of the display panel and obtaining the grayscale value of each pixel in the specific area. For example, it can use a selection frame to select a specific area in the edge image of the display panel. Because in the step 101, it already reads out the grayscale value of each pixel of the edge image of the display panel, therefore, according to the location of the selected specific area in the edge image of the display panel, it can easily obtain the grayscale value of each pixel in the specific area.

In step 103, it averages the grayscale values of all pixels in the specific area to obtain an average grayscale value of all pixels in the specific area. Then in step 104, based on the average grayscale value obtained foregoing, executing binarization for the grayscale value of each pixel in the specific area to obtain some boundary lines, wherein the grayscale values of the pixels on each boundary line are different from grayscale values of the other pixels which are not on the boundary lines in the specific area, that is, grayscale image of each boundary line has larger difference with the grayscale images outside the boundary lines such that each boundary line is easily to distinguish. Furthermore, a width of each boundary line can be the same as a width of each pixel in the specific area, but the present invention is not limited thereto.

Furthermore, in step 104, according to the average grayscale value of all pixels in the specific area to execute binarization for each pixel in the specific area, specifically is comparing the grayscale value of each pixel with the obtained average grayscale value in the specific area. Wherein, when a grayscale value of a pixel in the specific area is not smaller than (i.e., larger than or equal to) the average grayscale value, the grayscale value of that pixel is set to be "1", and when a grayscale value of a pixel in the specific area is smaller than the average grayscale value, the grayscale value of that pixel is set to be "0". Therefore, the grayscale value of each pixel in the specific area is transformed into "0" or "1". In this embodiment, the grayscale value of "0" represents the blackest for that pixel and the grayscale value of "1" represents the whitest for that pixel. Accordingly, in the specific area, the area outside the boundary line is the blackest, and the boundary lines are the whitest, it can easily distinguish each boundary line.

In step 105, in the specific area, it filters horizontal and vertical lines of the boundary lines to obtain some remaining boundary lines. It should be understood that the remaining boundary lines do not include the horizontal line (i.e., the horizontal boundary line) and the vertical line (i.e., the vertical boundary line).

In step 106, it fits a defect specification line for the remaining boundary lines to determine if the width (i.e., line width) of the remaining boundary line is smaller than the width of the defect specification line. When step 106 determines that the width of the remaining boundary line is not smaller than the width of the defect specification line, executing step 107 to confirm that the remaining boundary line is a defect line. When step 106 determines that the width of the remaining boundary line is smaller than the width of the defect specification line, it executes step 108 to confirm that the remaining boundary line is not a defect line. It can be understood that the defect line is the defect on the display panel such as the protrusion or the shell cracking at the terminal side of the display panel, etc.

The above-described embodiment of the present invention can be implemented by the hardware and firmware, or software or computer code stored in the recording medium (such as a CD ROM, RAM, floppy disk, hard disk or magneto-optical disk); or computer code originally stored in the remote record media downloading through the network or readable media in non-temporary machine and will be stored in the local record media. Therefore, the method or part of method can be executing by the software stored in the record media of the universal computer, a specific processor, or programmable or application specific hardware (such as ASIC or FPGA).

It can be understood that the computer, processor, microprocessor, controller, or programmable hardware include storage components (For example, RAM, ROM, flash memory, etc.) for storing or receiving software or computer code. When the software or computer code is executed by the computer, processor, or hardware, it can realize the method described here. Besides, when a universal computer executes the computer code used for realizing the method, the executing of the computer code will transform the universal computer into a specific computer for realizing the method.

Figure 2:
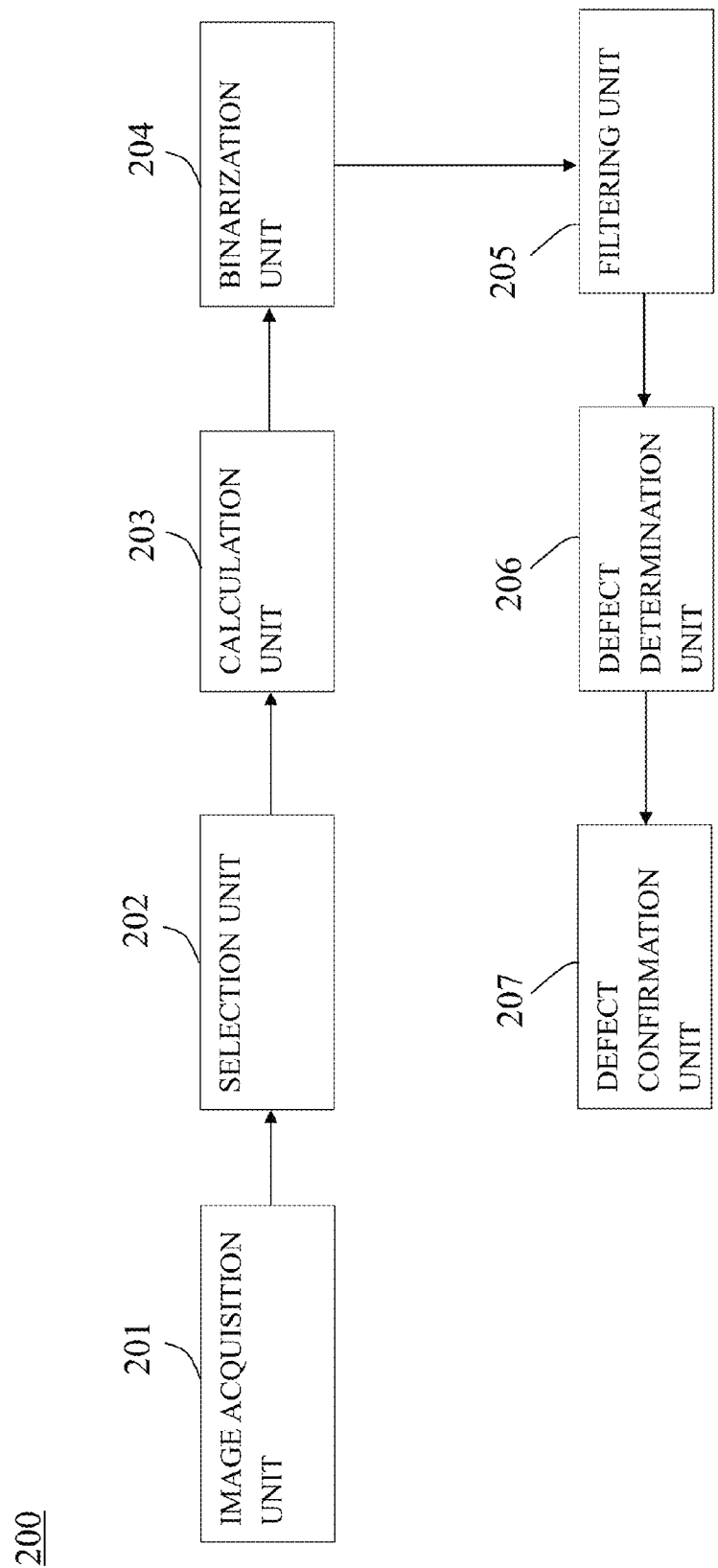
FIG. 2 is a block diagram of defect inspection device for display panel according to an embodiment of the present invention.

FIG. 2 is a block diagram of defect inspection device for a display panel according to an embodiment of the present invention.

As shown in FIG. 2, a display panel defect inspection device 200 according to an embodiment of the present invention comprises: an image acquisition unit 201, a selection unit 202, a calculation unit 203, a binarization unit 204, a filtering unit 205, a defect determination unit 206, and a defect confirmation unit 207.

The image acquisition unit 201 is for obtaining the edge image of the display panel and the grayscale value of each pixel in the edge image. Specifically, the image acquisition unit 201 may, for example, but not limited to, a charge-coupled device (CCD) image sensor, etc. The image acquisition unit 201 scans and obtains an edge image of the display panel using the preset parameters to obtain the edge image of the display panel and using a predetermined program to read the grayscale value of each pixel in the edge image of the display panel.

The selection unit 202 is for selecting a specific area in the edge image of the display panel obtained by the image acquisition unit 201, and obtaining the grayscale value of each pixel in the specific area. Here, because the image acquisition unit 201 has read out the grayscale value of each pixel in the edge image of the display panel, it can easily obtain the grayscale value if each pixel in the specific area according to the location of the specific area in the edge image of the display panel selected by the selection unit 202.

The calculation unit 203 is for calculating an average value of grayscale values of all pixels in the specific area to obtain an average grayscale value of all pixels in the specific area.

The binarization unit 204 is for executing binarization to the grayscale values of all pixels in the specific area based on the average grayscale value of all pixels in the specific area obtained by the calculation unit 203 to obtain some boundary lines. Wherein, the grayscale values of pixels on each boundary line are different from grayscale values of the other pixels which are not on the boundary lines in the specific area, that is, grayscale image of each boundary line has larger difference with the grayscale images outside the boundary lines such that each boundary line is easily to distinguish. Furthermore, a width of each boundary line can be the same as a width each pixel in the specific area, but the present invention is not limited thereto.

Furthermore, the binarization unit 204 execute binarization for each pixel in the specific area according to the average grayscale value of all pixels in the specific area, specifically is that the binarization unit 204 compares the grayscale value of each pixel with the obtained average grayscale value in the specific area. Wherein, when a grayscale value of a pixel in the specific area is not smaller than (i.e., larger than or equal to) the average grayscale value, the binarization unit 204 set the grayscale value of that pixel to be "1", and when a grayscale value of a pixel in the specific area is smaller than the average grayscale value, the binarization unit 204 set the grayscale value of that pixel to be "0". Therefore, the grayscale value of each pixel in the specific area is transformed into "0" or "1". In this embodiment, the grayscale value of "0" represents the blackest for that pixel and the grayscale value of "1" represents the whitest for that pixel. Accordingly, in the specific area, the area outside each boundary line is the blackest, and the boundary lines are the whitest, it can easily distinguish each boundary line.

The filter unit 205 is for filtering horizontal and vertical lines of the boundary lines to obtain some remaining boundary lines. It should be understood that the remaining boundary lines do not include the horizontal line (i.e., the horizontal boundary line) and vertical line (i.e., the vertical boundary line).

The defect determination unit 206 is for determining that if the width (i.e., line width) of the remaining boundary line is smaller than the width of the defect specification line. The defect confirmation unit 207 is for confirming that if the remaining boundary line is a defect line based on the determination of the defect determination unit 206. Specifically, if the defect determination unit 206 determines that the remaining boundary line is not smaller than the width of the defect specification line, the defect confirmation unit 207 confirms that the remaining boundary line is a defect line. If the defect determination unit 206 determines that the remaining boundary line is smaller than the width of the defect specification line, the defect confirmation unit 207 confirms that the remaining boundary line is not a defect line. It can be understand that the defect line is the defect on the display panel such as a protrusion or a shell cracking at the terminal side of the display panel, etc.

In summary, according to exemplary embodiments of the present invention, it is possible to easily distinguish some defects of the display panel which are difficult to be inspected (e.g., the protrusion or shell cracking at the terminal side of the display panel) to improve the inspection accuracy in order to enhance the defect inspection ability of the display panel.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A defect inspection method for a display panel, comprising:
    A) obtaining an edge image of a display panel by scanning and capturing an image at an edge side of the display panel according to a preset parameter and obtaining a grayscale value of each pixel of the edge image;
    B) selecting a specific area in the edge image and obtaining a grayscale value of each pixel in the specific area;
    C) averaging the grayscale values of all pixels in the specific area to obtain an average grayscale value of all pixels in the specific area;
    D) executing binarization for the grayscale value of each pixel in the specific area to obtain some boundary lines based on the average grayscale value, wherein the grayscale values of pixels on the boundary lines are different from grayscale values of the other pixels which are not on the boundary lines;
    E) filtering horizontal and vertical lines of the boundary lines to obtain some remaining boundary lines, wherein, the remaining boundary lines do not include the horizontal lines of the boundary lines and the vertical lines of the boundary lines; and
    F) fitting a defect specification line for the remaining boundary lines, wherein, if a width of a remaining boundary line is not smaller than a width of the defect specification line, confirming that the remaining boundary line is a defect line.

2. The defect inspection method according to claim 1, wherein, further comprising a step of:
    G) if a width of a remaining boundary line is smaller than a width of a defect specification line, confirming that the remaining boundary line is not a defect line.

3. The defect inspection method according to claim 2, wherein, in the step D, a specific method to realize "executing binarization for the grayscale value of each pixel in the specific area to obtain some boundary lines based on the average grayscale value" is: comparing the grayscale value of each pixel in the specific area with the average grayscale value; wherein, when a grayscale value of a pixel in the specific area is not smaller than the average grayscale value, the grayscale value of that pixel is set to be "1", and when a grayscale value of a pixel in the specific area is smaller than the average grayscale value, the grayscale value of that pixel is set to be "0".

4. The defect inspection method according to claim 3, wherein, a width of each boundary line is the same as a width of each pixel.

5. The defect inspection method according to claim 2, wherein, a width of each boundary line is the same as a width of each pixel.

6. The defect inspection method according to claim 1, wherein, in the step D, a specific method to realize "executing binarization for the grayscale value of each pixel in the specific area to obtain some boundary lines based on the average grayscale value" is: comparing the grayscale value of each pixel in the specific area with the average grayscale value; wherein, when a grayscale value of a pixel in the specific area is not smaller than the average grayscale value, the grayscale value of that pixel is set to be "1", and when a grayscale value of a pixel in the specific area is smaller than the average grayscale value, the grayscale value of that pixel is set to be "0".

7. The defect inspection method according to claim 6, wherein, a width of each boundary line is the same as a width of each pixel.

8. The defect inspection method according to claim 1, wherein, a width of each boundary line is the same as a width of each pixel.

9. A defect inspection device for a display panel, comprising:
- an image acquisition unit being configured to obtain an edge image of a display panel by scanning and capturing an image at an edge side of the display panel according to a preset parameter and to obtain a grayscale value of each pixel in the edge image;
- a selection unit being configured to select a specific area in the edge image and obtain a grayscale value of each pixel in the specific area;
- a calculation unit being configured to calculate an average value of the grayscale values of all pixels in the specific area to obtain an average grayscale value of all pixels in the specific area;
- a binarization unit being configured to execute binarization for the grayscale values of all pixels in the specific area based on the average grayscale value to obtain some boundary lines, wherein, the grayscale values of pixels on the boundary lines are different from grayscale values of the other pixels which are not on the boundary lines;
- a filter device being configured to filter horizontal and vertical lines of the boundary lines to obtain some remaining boundary lines, wherein, the remaining boundary lines do not include the horizontal lines of the boundary lines and the vertical lines of the boundary lines;
- a defect determination unit being configured to determine that if a width of a remaining boundary line is smaller than a width of a defect specification line; and
- a defect confirmation unit being configured to confirm that a remaining boundary line is a defect line when the defect determination unit determines that a width of the remaining boundary line is not smaller than a width of a defect specification line.

10. The defect inspection device according to claim 9, wherein, when the defect determination unit determines that a width of a remaining boundary line is smaller than a width of a defect specification line, the defect confirmation unit confirms that the remaining boundary line is not a defect line.

11. The defect inspection device according to claim 10, wherein, the binarization unit compares the grayscale value of each pixel in the specific area with the average grayscale value;
wherein, when a grayscale value of a pixel in the specific area is not smaller than the average grayscale value, the grayscale value of that pixel is set to be "1", and when a grayscale value of a pixel in the specific area is smaller than the average grayscale value, the grayscale value of that pixel is set to be "0".

12. The defect inspection device according to claim 11, wherein, a width of each boundary line is the same as a width of each pixel.

13. The defect inspection device according to claim 10, wherein, a width of each boundary line is the same as a width of each pixel.

14. The defect inspection device according to claim 9, wherein, the binarization unit compares the grayscale value of each pixel in the specific area with the average grayscale value; wherein, when a grayscale value of a pixel in the specific area is not smaller than the average grayscale value, the grayscale value of that pixel is set to be "1", and when a grayscale value of a pixel in the specific area is smaller than the average grayscale value, the grayscale value of that pixel is set to be "0".

15. The defect inspection device according to claim 14, wherein, a width of each boundary line is the same as a width of each pixel.

16. The defect inspection device according to claim 9, wherein, a width of each boundary line is the same as a width of each pixel.

* * * * *